United States Patent [19]
Rohrbaugh et al.

[11] Patent Number: 5,481,167
[45] Date of Patent: Jan. 2, 1996

[54] AMPLIFIER AND METHOD FOR DETECTING THE BEMF OF A COIL OF A POLYPHASE SENSORLESS DC MOTOR

[75] Inventors: Mark E. Rohrbaugh; Francesco Carobolante, both of Phoenix, Ariz.

[73] Assignee: SGS-Thomson Microelectronics, Inc., Carrollton, Tex.

[21] Appl. No.: 236,668

[22] Filed: May 2, 1994

Related U.S. Application Data

[63] Continuation of Ser. No. 843,564, Feb. 28, 1992, abandoned.
[51] Int. Cl.$^6$ ..................................................... H02K 23/00
[52] U.S. Cl. ............................................ 318/254; 318/439
[58] Field of Search ................................. 318/254, 138, 318/439; 188/809–815

[56] References Cited

U.S. PATENT DOCUMENTS

| | | | |
|---|---|---|---|
| 4,169,990 | 10/1979 | Erdman | 318/254 X |
| 4,390,826 | 6/1983 | Erdman et al. | 318/254 X |
| 4,636,936 | 1/1987 | Boyd et al. | 318/254 X |
| 4,922,169 | 5/1990 | Freeman | 318/254 |
| 4,928,043 | 5/1990 | Plunkett | 318/254 |

*Primary Examiner*—David S. Martin
*Attorney, Agent, or Firm*—Richard A. Bachand; Rodney M. Anderson; Lisa K. Jorgenson

[57] ABSTRACT

A circuit and method for detecting when the back emf of a motor coil passes a predetermined level includes circuitry for providing a voltage proportional to the back emf of the motor coil, and circuitry for providing a voltage proportional to a reference potential. A first bias voltage is added to the voltage proportional to the back emf to produce a first added voltage, and a second bias voltage is added to the reference potential when the back emf of the motor coil is expected to change in a predetermined direction to produce a second added voltage. A comparator produces an output change when the first added voltage becomes larger than the second added voltage at the predetermined level.

33 Claims, 2 Drawing Sheets

AMPLIFIER AND METHOD FOR DETECTING THE BEMF OF A COIL OF A POLYPHASE SENSORLESS DC MOTOR

The present application is a continuation of application Ser. No. 07/843,564 filed Feb. 28, 1992, now abandoned.

BACKGROUND OF THE INVENTION

1. Field of the Invention

This invention relates to improvements in circuitry that can be used in driving polyphase dc motors, and still more particularly to methods and apparatus for developing information concerning the crossing of a reference voltage by the back emf (bemf) of non-selected or floating field coils for controlling a spinning rotor of a polyphase dc motor, and still more particularly to methods and apparatus for detecting the reference voltage crossings of the back emf of floating field coils for controlling coil commutation signals, even at low motor speeds.

2. Description of the Prior Art

Although the present invention pertains to polyphase dc motors, in general, it finds particular application in conjunction with three phase dc motors, particularly of the brushless, sensorless type which are used for rotating data media, as may be found in computer related applications, such as hard disk drives, CD ROM drives, floppy disks, VCRs, and the like. In such computer applications, three phase brushless, sensorless dc motors are becoming more popular, due to their reliability, low weight, and accuracy.

Usually, motors of this type can be thought of as having a stator with three field coils, generally connected in a "Y" configuration, although actually, a larger number of stator coils are usually employed with multiple motor poles. Typically, in such applications, eight pole motors are used which have four electrical cycles per revolution of the rotor. The stator coils, however, can be still be analyzed in terms of three "Y" connected coils, connected in three sets of four coils, each physically separated by 90°. In operation in bipolar applications, the coils are energized in sequences in each of which a current path is established through two coils of the "Y", with the third coil left floating. The sequences are arranged so that as the current paths are changed, or commutated, one of the coils of the current path is switched to float, and the previously floating coil is switched into the current path. Moreover, the sequence is defined such that when the floating coil is switched into the current path, current will flow in the same direction as in the coil which was included in the prior current path. In this manner, six commutation sequences are defined for each electrical cycle in a three phase motor.

In the past, during the operation of a such polyphase, sensorless dc motor, it has been recognized that maintaining a known position of the rotor is an important concern. There have been various ways by which this was implemented. The most widely used way, for example, was to start the motor in a known position, then develop information related to the instantaneous or current position of the rotor. One source of such instantaneous position information was developed as a part of the commutation process, and involved identifying the floating coil, and monitoring its back emf (bemf), that is, the emf induced into the coil as it moves through the magnetic field provided by the stator.

When the voltage of the floating coil crossed zero (referred to in the art as "a zero crossing"), the position of the rotor was assumed to be known. Upon the occurrence of this event, the rotor coil commutation sequence was incremented to the next phase, and the process repeated.

However, particularly at startup of the motor, a problem exists, since the motor speed is low, and the bemf developed is very small and is difficult to detect with the sufficient accuracy to enable precision commutation of the activation voltages on the field windings of the motor. The inability to accurately determine the position of the rotor can lead to motor position inaccuracies, and even loss of synchronization. Thus, in the past, great care had to be taken to insure that the startup algorithms and running conditions were precisely controlled to avoid anything which might cause such out of synchronization condition to occur.

SUMMARY OF THE INVENTION

In light of the above, therefore, it is an object of the invention to provide an improved method by which the back emf of a floating coil of a polyphase dc motor can be detected.

It is another object of the invention to provide a method of the type described which is effective to detect the back emf of a polyphase dc motor that can be used at low motor speeds or with small magnitudes of back emf.

It is another object of the invention to provide a method of the type described that does not contribute to jitter or motor switching imprecision.

It is yet another object of the invention to provide an apparatus for performing the method in accordance with the invention.

It is another object of the invention to provide an improved apparatus and method of the type described which is useful in three phase dc motor applications, particularly motors of the brushless, sensorless type which are used for rotating data media, such as found in computer related applications, including hard disk drives, CD ROM drives, floppy disks, and the like.

These and other objects, features and advantages of the invention will be apparent to those skilled in the art from the following detailed description of the invention, when read in conjunction with the accompanying drawings and appended claims.

Thus, in accordance with a broad aspect of the invention, a circuit for detecting when the back emf of a motor coil passes a predetermined level is presented. The circuit includes circuitry for providing a voltage proportional to the back emf of the motor coil, and circuitry for providing a voltage proportional to a reference potential. Circuitry is provided for adding a first bias voltage to the voltage proportional to the back emf to produce a first added voltage, and circuitry is also provided for adding a second bias voltage to the reference potential when the back emf of the motor coil is expected to change in a predetermined direction, the second bias voltage being larger than the first bias voltage, for example twice as large, to produce a second added voltage. A comparator produces an output change when the first added voltage becomes larger than the second added voltage at the predetermined level. The motor coil may be one of a plurality of motor field coils connected in a "Y" configuration, and the reference potential is produced at a center tap connection of the plurality of motor field coils. Circuitry may also be provided for adding a first hysteresis bias voltage to the second added voltage, and for adding a second hysteresis bias voltage larger than the first hysteresis bias current, for example twice as large, to the first added voltage when the output of the comparator is low.

In accordance with another broad aspect of the invention, a circuit for detecting the back emf of a motor coil for use in determining the position of the rotor of the motor is provided. The circuit includes a comparator having an inverting input and a noninverting input operative to produce a change in output state when a voltage applied to the inverting input exceeds a voltage applied to the noninverting input. First and second current paths each having a current control element and at least one resistor element on which a voltage is developed in response to the current in the current path is connected with the voltage on each resistor element being connected to respective inverting and noninverting inputs of the comparator. One end of the motor coil is connected to the current control element of the first current path, and a reference potential being connected to the current control element of the second current path, whereby the back emf across the coil produces a change in voltage on the resistor element of the first current path with respect to the voltage on the resistor element of the second current path. A signal generating means generates a signal in anticipation of the direction of change of the back emf that will be developed in the motor coil. Means are provided for biasing the first current path with a preset bias current, and for switchably biasing the second current path with an increased preset bias current. A switch operates in response to the signal in anticipation of the direction of change of the back emf to switchably apply the increased preset bias current to the second current path, whereby the comparator produces an output state change when the back emf of the motor coil exceeds a value determined by the preset bias current. The circuit may also include means for biasing the second current path with a hysteresis bias current, means for switchably biasing the first current paths with an increased hysteresis bias current, and a switch operative in response to the output of the comparator to switchably apply the increased hysteresis bias current to the first current path.

In accordance with yet another broad aspect of the invention, a back emf amplifier for amplifying the back emf of a field coil of a polyphase sensorless dc motor provided. The amplifier has a comparator having an inverting input and a noninverting input operative to produce a change in output state when a voltage applied to the inverting input exceeds a voltage applied to the noninverting input. First and second balanced current paths are provided, each current path including a transistor having a current path and two resistors. The current path of the transistor and the two resistors is connected in series with the current path and one of the two resistors being connected at a first node, and the two resistors being connected at a second node. The first node of the first current path is connected to the noninverting input of the comparator, and the first node of the second current path is connected to the inverting input of the comparator. One end of the field coil is connected to a control terminal of the transistor of the first current path, and a reference potential is connected to a control terminal of the transistor of the second current path, whereby the back emf across the field coil produces a change in voltage at the first node of the first current path with respect to the voltage on the first node of the second current path. Circuitry is provided for biasing the first current path with a preset bias current connected to the second node of the first current path, and for switchably biasing the second current path with an increased preset bias current connected to the second node of the second current path. A circuit is provided for producing a signal indicating the anticipated direction of change of the back emf that will be developed in the field coil, and a switch operative in response to the signal indicating the anticipated direction of change of the back emf switchably applies the increased preset bias current to the second current path whereby the comparator produces an output state change when the back emf of the motor coil exceeds a value determined by the preset bias current. Circuitry is also provided for biasing the second current path with a hysteresis bias current connected to the second node of the second current path and for switchably biasing the first current paths with an increased hysteresis bias current connected to the second node of the first current path. A switch operative in response to the output of the comparator switchably applies the increased hysteresis bias current to the first current path.

In accordance with still another broad aspect of the invention, a method for detecting the back emf of a motor coil for use in determining the position of the rotor of the motor is presented. In accordance with the method, a voltage proportional to a voltage on the motor coil with response to a reference potential, and a voltage proportional to the reference potential, of same proportional ratio as the voltage proportional to a voltage on the motor coil are generated. A signal in anticipation of the direction of change of the back emf that will be developed in the motor coil is generated, and a first fixed bias voltage is added to the voltage proportional to the reference potential to produce a first added voltage, and, in response to the signal in anticipation of the direction of change of the back emf, a second fixed bias voltage higher than the first fixed bias voltage is switchably added to the voltage proportional to a voltage on the motor coil to produce a second added voltage. The first and second added voltages are then compared to produce an output voltage.

In accordance with yet another broad aspect of the invention, a method for operating a polyphase sensorless dc motor is presented. In accordance with the method, field coil voltages are commutated in response to a back emf of floating field coils crossing a reference voltage. The crossings are determined by generating an amplified differential voltage proportional to the differential voltage across the floating coils. Such amplified differential voltage is presented at the outputs of the amplifier. A signal in anticipation of the direction of change of the back emf that will be developed in the floating coils is generated, and a first fixed bias voltage is added to the first output node of the amplified differential voltage. In response to the signal in anticipation of the direction of change of the back emf, a second fixed bias voltage higher than the first fixed bias voltage is switchably added to the second output node of the amplified voltage. The resulting voltages at the two outputs are then compared to produce an output voltage for timing the field coil commutation.

BRIEF DESCRIPTION OF THE DRAWINGS

The invention is illustrated in the accompanying drawings in which.

Figure 2:
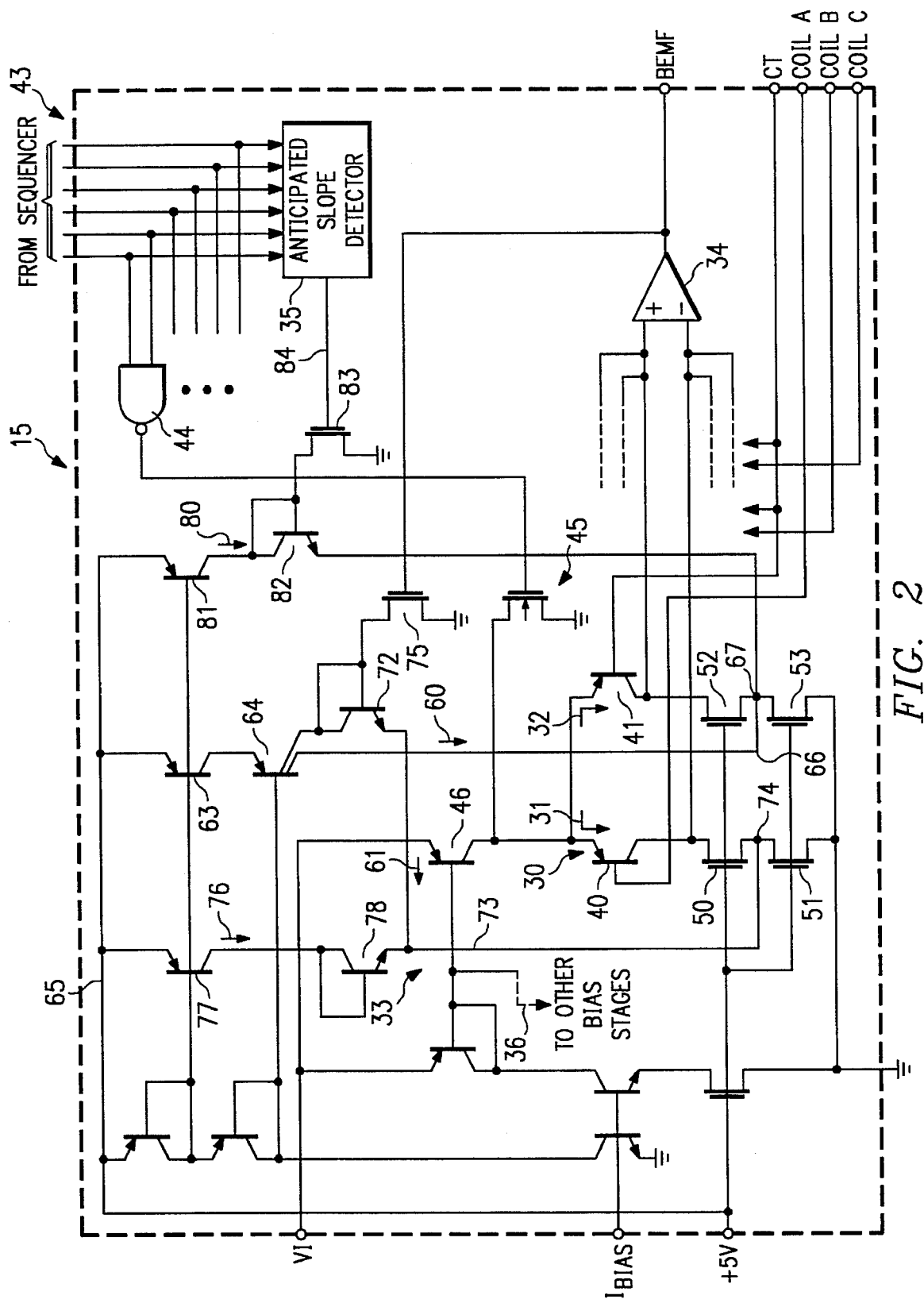

And, FIG. 2 is an electrical schematic diagram of a back emf amplifier and reference voltage crossing detector, in accordance with a preferred embodiment of the invention.

In the various figures of the drawing, like reference numerals are used to denote like or similar parts.

DETAILED DESCRIPTION OF THE PREFERRED EMBODIMENT

Figure 1:
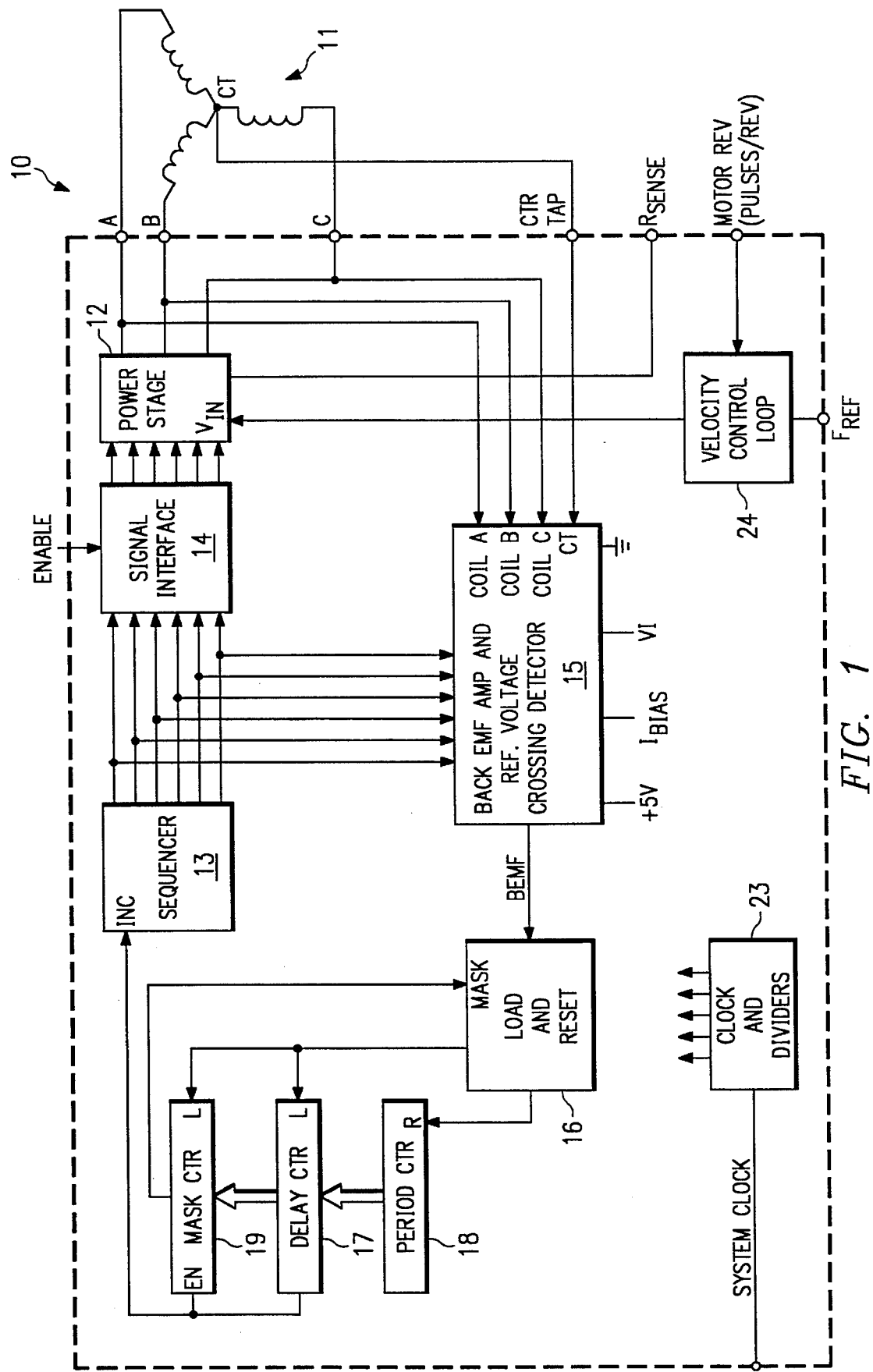
FIG. 1 is a block diagram of a motor control circuit showing its connections to a Y-connected motor winding, and including a back emf amplifier and zero-crossing detector, in accordance with a preferred embodiment of the invention.

A portion of an electrical schematic block diagram of a motor controller circuitry 10 in which the apparatus and method in accordance with a preferred embodiment of the invention may be incorporated is shown in FIG. 1. Although the motor controller can be constructed of discrete components, preferably, the motor controller 10 is integrated onto a single semiconductor chip adapted for connection to the stator coils of a three phase dc brushless spindle motor, for use, for example, to turn a magnetic or other disk in systems such as computer hard disk drives, cd-rom drives, floppy disk drives, VCRs, and the like. Such three phase motor preferably has "Y" connected stator windings 11, although such Y configured winding connections are not essentially required. Thus, the respective windings 11 and their center connection point can be connected to output terminals A, B, C and CTR TAP, as shown. It should be noted that although a preferred embodiment of the invention is described with regard to a three phase motor, in particular, the principles of the invention can be equally advantageously applied to polyphase motors, in general; also, it should be understood that the center tap (CT) connection may be simulated in some applications.

The motor controller circuitry can be configured in a manner generally similar to that described in U.S. Pat. No. 5,306,988, filed Oct. 3, 1991, entitled METHOD AND APPARATUS FOR OPERATING POLYPHASE DC MOTORS, by the applicants herein, and assigned to the same assignee as the instant application, said U.S. Pat. No. 5,306,988 being incorporated herein by reference.

The driving voltage is provided to the output terminals A, B, and C by a power stage 12, which may be configured as described in said U.S. Pat. No. 5,306,988. The power stage 12 is sequenced to provide sequential control output signals to the output terminals A, B, and C by a sequencer circuit 13 and a signal interface circuit 14 that delivers the output signals from the sequencer circuit 13 to the power stage 12. The sequencer circuit 13 and the signal interface circuit 14 also can be configured as described in said U.S. Pat. No. 5,306,988. The sequencer 13 also provides drive signals to other circuits of the controller circuitry to control the various aspects of rotation of the motor driven by the circuit 10.

The output terminals A, B, and C are also switchably connected to a back-emf sense amplifier and reference voltage crossing detector circuit 15, the details of which are described below with reference to FIG. 2. The back-emf sense amplifier and reference voltage crossing detector circuit 15 in turn delivers signals to a load and reset circuit 16 that controls a delay counter 17 to control the increment operation of the sequencer 13. A period counter 18 and mask counter 19 are also provided to control the operation of the sequencer 13 and of the control circuit 10, in a manner similar to that described with respect to the system of said U.S. Pat. No. 5,306,988.

The motor controller circuitry 10 also includes system clock circuitry 23, and velocity control loop 24, and may include various other circuitry, not shown, such as circuitry to support pulse width modulation operation of the motor, "align and go" start up circuitry to facilitate start up of the motor from a stopped condition, port control logic and associated shift register circuitry to facilitate control of the motor controller circuitry by an external microprocessor (not shown), and so forth.

In operation, during an energized phase, one node (for example, node A) is driven high by the circuitry of the power state 12, and another node (for example, node B) is driven low. The remaining node (for example, node C) is left floating. This is be referred to as the "AB phase". The coils are then switched in a commutation sequence determined by the sequence circuit 13 in a manner such that in each commutation phase current always flows in two of the three coils, with the third coil floating, and that after switching current will continue to flow, and in the same direction, in one of the two coils in which current was flowing in the previous phase. Such operation is commonly referred to as "bipolar operation." "Unipolar operation", in which only one coil is energized at any time, may alternatively be employed.

The switching of the driver transistors of the power stage 12 to effect the switching currents for each commutation phase is accomplished by a sequencer circuit 13 and an associated interface circuit 14.

The commutation among the coils 11 is performed in response to information indicating the specific position of the rotor of the motor in conjunction with circuit information indicating the desired position of the rotor. More specifically, the commutation to apply the successive sequence of driving signals to the coils 11 is determined in response to a corresponding coil reaching a particular rotational position and its correlation with sequencer information indicating where the motor should be at a particular time prior to when a commutation is to occur. The determination of the precise rotational location of the rotor is continuously being updated by monitoring the reference voltage crossing voltage in each non-driven, or floating, coil. More particularly, as the coils 11 are switched during the commutation sequence of the rotor, the voltage of the floating coil is monitored by the back emf amplifier circuit 15 shown in FIG. 2.

With reference now to FIG. 2, the back emf amplifier circuit 15 receives inputs from the output of the sequencer 13 shown in FIG. 1, as well as connections to the center tap and nodes A, B, and C of the coils 11. The back emf amplifier circuit 15 includes circuitry 30 that includes current path pairs 31 and 32 in which the current is respectively controlled by the voltage on one of the coils 11, for example on node A, and the center tap potential. Similar current path circuitry (not shown) are provided for the remaining two coil connections B and C.

Bias circuitry 33 is provided to bias the current path pairs 31 and 32, in a manner described below in detail. Outputs derived from the current path pairs 31 and 32 are respectively connected to the inverting and non-inverting inputs of a comparator 34, the output of which represents the back emf signal for use in the motor driver circuitry 10, shown in FIG. 1.

The outputs from the sequencer 13 in FIG. 1 are connected to the inputs of an anticipated slope detector circuit 35, which provides outputs to switchably select which of the current path pairs (i.e., the pairs 30 or the pairs, not shown, associated with coils connected to nodes B and C) are instantaneously operative.

The purpose of the current path pairs 30 is to develop voltage signals for comparison from the input signals applied to the bases of transistors 40 and 41, respectively from the node A and the node CT from the center tap connection of the coils 11. Thus, the outputs from the collectors of the transistors 40 and 41 are connected respectively to the inverting and non-inverting inputs of the comparator 34. More particularly, the particular current path pairs 30 to be instantaneously operative, depending upon the commutative sequence of the coils 11, is determined from the input lines 43 from the sequencer circuit 13 in FIG. 1. Thus, for example, the first two lines of the lines 43 representing, for instance, a pair of upper and lower drivers (not shown) in the power stage 12 of FIG. 1, are compared in a NAND gate 44 to operate a transistor switch 45 that controls the bias to select the current path pairs 30. Similar sequencer line comparators are provided for the respective current path pairs provided for the other coils of the coils 11 that operate from respective other lines in the lines 43 from the sequencer 13.

A first part of the bias circuit 33 supplies normal current bias to the emitters of the transistors 40 and 41 in the current path pairs 31 and 32. It should be understood that similar stages are employed for the various other driving combinations, connected for example, to control line 36. For this purpose, the first stage 33 includes a PNP transistor 46 that is connected with its emitter-collector path connected to an input voltage, VI.

The current path pair 31 and 32 respectively include FETs 50 and 51, connected between the collector of the transistor 40 and ground, and FETs 52 and 53 connected between the collector of the transistor 41 and ground. The gates of the transistors 50–53 are connected to a positive voltage supply different from the input voltage, VI, for example to a +5 volt supply as shown. The FETs 50–53, therefore, operate as resistive loads upon the collectors of the PNP transistors 40 and 41. Thus, in normal operation, when the current path pair 30 is selected through the operation of the transistor switch 45, bias current is supplied to the current paths 31 and 32 through the PNP transistor 46 to flow through the transistors 40 and 41 and their respective loads 50 and 51, as well as 52 and 53. It should be noted that FETs 50 and 52 and FETs 51 and 53 are equally sized so that a balanced current flows through both current paths 31 and 32, in the absence of other factors. Resistors may also be used in place of the FETs.

A hysteresis bias current is additionally supplied to both current paths 31 and 32. The hysteresis current that is applied to the path 31 is of a value of twice the hysteresis current that is supplied to the current path 32. In addition, the hysteresis bias current that is applied to the current path 31 is switchably applied in dependence upon the voltage of the back emf output produced by the comparator 34. More particularly, two hysteresis bias current paths 60 and 61 are provided. The hysteresis bias current path 60 includes PNP transistors 63 and 64, the emitter-collector current paths of which being connected in series between a source of potential, such as a +5 volt on a line 65 and a line 66 connected to a node 67 between the two resistive loads provided by FETs 52 and 53.

In addition, the hysteresis current bias path 61 includes an NPN transistor 72, having its emitter-collector current path connected in series with the current flow path of the PNP transistors 63 and 64. The emitter of the transistor 72 is connected by a line 73 to a node 74 at the interconnection between the resistive load FETs 50 and 51. Thus, a hysteresis current bias of $1 \times I_{hyst}$ is applied on line 66 to the node 67 between resistor transistors 52 and 53, and when the back emf output from the comparator 34 goes high, through the operation of the transistor 75, the transistor 72 is biased to prevent the hysteresis bias current from being applied to the node 74 between the resistive load transistors 50 and 51. On the other hand, when the back emf voltage at the output of the comparator 34 is low, by virtue of the action of the NPN transistor 72, twice the hysteresis bias current, $2 \times I_{hyst}$, is applied to the node 74 between the resistive load transistors 50 and 51, and at the same time, one times the hysteresis current, $1 \times I_{hyst}$, is applied to the node between the resistor transistors 52 and 53. The effect of this biasing arrangement, with respect to the hysteresis current, is to change the threshold at which the comparator 34 is switched in response to the voltage between the coil on node A and the center tap of the coils 11.

Thus, in operation, when the output from the comparator 34 is low, a bias current of $1 \times I_{hyst}$ is supplied to the node 67 between the resistive load transistors 50 and 51, and no hysteresis bias current is supplied to the node 74 between the resistive load transistors 50 and 51. As the voltage applied to the base of the PNP transistor 40 from the coil on node A increases to a level at which the comparator 34 begins to switch, the change in state on the output of the comparator 34 causes a bias current of $2 \times I_{hyst}$ be applied to the node 74 between the resistive load transistors 50 and 51. No change occurs in the hysteresis bias upon the node 67. This operation assists the transition at the threshold of the comparator 34, resulting in a clean, rapid transition through the threshold at the switch-over point.

In addition to the foregoing hysteresis bias circuit, a preset bias is also applied to the nodes 67 and 74 between the respective resistive load transistors 50 and 51, and 52 and 53. The preset bias applied to the node 74 between the transistors 50 and 51 is a single valued preset bias (i.e., $1 \times I_{pre}$) supplied by the PNP transistor 77 and NPN transistor 78 in the current path 76. In addition, a preset current bias path 80 is provided, including PNP transistor 81 and NPN transistor 82, connected between the voltage supply line 65 and the node 67 between the resistive load transistors 52 and 53. The base of the NPN transistor 82 is controlled by a switch transistor 83, which receives an input on its gate from the anticipated slope detector circuit 35 on line 84.

In operation, when the signal on the line 84 from the anticipated slope detector circuit 35 indicates that a whereby only the preset bias of $1 \times) I_{pre}$ is provided on the positive to negative transition is anticipated by the back emf on the coil on node A, the switch 83 is activated, current path 76 to the node 74 between the resistive load transistors 50 and 51. On the other hand, when the anticipated slope of the back emf is expected to be from negative to positive, the switch 83 allows the NPN transistor 82 to apply a bias current of $2 \times I_{pre}$ to the node 67 between the resistive load transistors 52 and 53. Thus, in the operation of the preset portion of the circuit, a normal preset bias exists on the comparator 34 by virtue of the current bias equal to $1 \times I_{pre}$ applied by the current path 76 to the node 74 between the resistive load transistors 50 and 51. To be detected, a back emf voltage that is transitioning from positive to negative must cause a current that overcomes the preset bias current $1 \times I_{pre}$. In similar fashion, on the other hand, to be detected, a back emf voltage that is transitioning from negative to positive must also produce a current in the current path 32 that overcomes the preset bias $I_{pre}$, since a bias current of $2 \times I_{pre}$ is applied through the current path 80 to the node 67 between the resistive load transistors 52 and 53.

The ultimate effect of the biasing arrangement is to preset or set the output of the back emf amplifier to a specific state in the absence of a back emf signal, such as at startup after an align has been performed, to enable the first zero crossing to be correctly detected. This allows correct positioning of the back emf comparator when no motion exists so as to correctly detect the first transition of the back emf when the motor starts moving.

The problem that is addressed is that in a comparator that has hysteresis, if the input is within the range of the hysteresis, the state of the output is uncertain. For example, the output can be either high or low, because the input will not force either state. Therefore, by the shifting of the reference level to above or below the hysteresis region, it can be assured that the comparator is forced in one particular state. That is it is assured that the comparator is in one particular output state, either high or low, depending on what the expected transition of the output will be once the motor is moved from the startup position.

It should also be noted that the provision of a voltage detection that is non-zero may produce a delay between the time the back emf actually crosses zero and the time that the back emf crosses the preset voltage threshold. This can be compensated easily in the delay circuitry 17 (see FIG. 1) by appropriate adjustment of the clock frequency, or of the count to which the delay counter is permitted to count prior to incrementing the sequencer 13.

It should also be noted that with respect to the relative sizes of the bias currents, preferably the normal bias current that is provided by the current path that includes the PNP transistor 46 is larger than the bias of the preset circuitry on line 76. The bias of the preset circuitry on line 76, in turn, preferably is larger than the bias of the hysteresis circuit provided on the line 73. It will be appreciated, however, that other biasing arrangements and relative magnitudes may be employed, depending upon the particular application in which the circuit 15 is used.

As mentioned one advantage provided by the back emf amplifier of the invention is that by virtue of the preset bias, at startup of the motor, the output of the back emf amplifier is in a correct state to enable rapid synchronization with the rotor of the motor with which the circuit is associated. More particularly, without a preset bias, the output of the back emf amplifier could be either high or low; however, by virtue of the preset bias, the output of the back emf amplifier is in a known correct state to enable the rapid synchronization of the motor upon the occurrence of a correctly sensed back emf signal.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

We claim:

1. A circuit for detecting a back emf signal of a motor coil, comprising:

circuitry for providing a differential voltage proportional to the back emf of the motor coil;

circuitry for adding a first hysteresis bias current to said circuitry for providing a differential voltage, to modify the produced differential voltage;

circuitry for adding a second hysteresis bias current to said circuitry for providing a differential voltage, to modify the produced differential voltage responsive to the back emf approaching a zero crossing from a predetermined direction, said second hysteresis bias current opposing and of greater magnitude than said first hysteresis bias current; and a comparator connected to receive the modified differential voltage to produce an output state change when the modified differential voltage exceeds a predetermined value.

2. The circuit of claim 1 wherein said motor coil is one of a plurality of motor field coils connected in a "Y" configuration.

3. The circuit of claim 1 wherein the magnitude of said second hysteresis bias current is twice as large as the magnitude of said first hysteresis bias current.

4. The circuit of claim 1 wherein said circuitry for adding a second hysteresis bias current is coupled to said comparator, so that the second hysteresis bias current is added responsive to the output of said comparator being low.

5. The circuit of claim 4 wherein the magnitude of said second hysteresis bias current is twice as large as the magnitude of said first hysteresis bias current.

6. A circuit for detecting a back emf signal of a motor coil for use in determining a position of the rotor of the motor, comprising:

a comparator;

first and second current paths each comprising a current control element and at least one resistor element on which a voltage is developed in response to a current in the current path, the voltage on each resistor element being connected to respective inputs of said comparator;

one end of said motor coil being connected to said current control element of said first current path, and a reference potential being connected to said current control element of said second current path, whereby the back emf signal across said coil produces a change in voltage across the resistor element of said first current path with respect to the voltage across the resistor element of said second current path;

means for selectively producing a first signal during detection of the back emf signal developed in said motor coil when the back emf signal approaches a zero crossing from a predetermined direction;

means for biasing said first current path with a preset bias current;

means for switchably biasing said second current path with an increased preset bias current; and a switch operative in response to said first signal to switchably apply the increased preset bias current to said second current path, said comparator producing an output state change when the back emf signal of said motor coil exceeds a value determined by said preset bias current.

7. The circuit of claim 6 wherein said comparator has an inverting input and a noninverting input operative to produce a change in output state when a voltage applied to the inverting input exceeds a voltage applied to the noninverting input, said voltage across said resistor element in said first current path being connected to the inverting input of said comparator, and said voltage across said resistor element in said second current path being connected to the noninverting input of said comparator.

8. The circuit of claim 6 wherein said motor coil is one of a plurality of motor field coils connected in a "Y" configuration, and said reference potential connected to said current control element of said second current path is produced at a center tap connection of said plurality of motor field coils.

9. The circuit of claim 6 wherein said means for switchably biasing said second current path with an increased preset bias current comprises means for switchably biasing said second current path with a bias current of twice said preset bias current.

10. The circuit of claim 6 wherein said current control element of each of said first and second current paths is a bipolar transistor.

11. The circuit of claim 6 wherein said resistor element of each of said first and second current paths is an FET.

12. The circuit of claim 9 wherein said FETs of said first and second current paths have equal resistance.

13. The circuit of claim 6 wherein said current control element of each of said first and second current paths is a bipolar transistor, and wherein said resistor element of each of said first and second current paths is a pair of FETs, the current paths of said bipolar transistor and said FETs being connected in series, the output voltage being developed between said bipolar transistor and one of said FETs and the bias current being connected between said FETs.

14. The circuit of claim 6 further comprising:
means for biasing said second current path with a hysteresis bias current;
means for switchably biasing said first current paths with an increased hysteresis bias current;
and a switch operative in response to the output of said comparator to switchably apply the increased hysteresis bias current to said first current path.

15. The circuit of claim 6 wherein said means for switchably biasing said first current path with an increased hysteresis bias current comprises means for switchably biasing said first current path with a bias current of twice said hysteresis bias current.

16. The circuit of claim 6 further comprising means for switchably applying a bias current to both said first and second current paths, and means for generating a signal when said motor coil is floating for actuating said means for switchably applying a bias current.

17. A back emf signal amplifier for amplifying a back emf signal of a field coil of a polyphase sensorless dc motor, comprising:
a comparator;
first and second balanced current paths, each current path comprising:
a transistor having a current path,
and two resistive elements,
said current path of said transistor and said two resistive elements being connected in series with said current path and one of said two resistive elements being connected at a first node, and said two resistive elements being connected at a second node;
the first node of said first current path and the first node of said second current path being connected to respective inputs of said comparator;
one end of said field coil being connected to a control terminal of said transistor of said first current path, and a reference potential being connected to a control terminal of said transistor of said second current path, whereby the back emf signal across said field coil produces a change in voltage at said first node of said first current path with respect to the voltage on the fist node of said second current path;
a circuit for selectively producing a first signal during detection of the back emf signal developed in said field coil when the back emf signal approaches a zero crossing from a predetermined direction;
circuitry for biasing said first current path with a preset bias current connected to said second node of said first current path;
circuitry for switchably biasing said second current path with an increased preset bias current connected to said second node of said second current path;
a switch operative in response to said first signal to switchably apply the increased preset bias current to said second current path,
said comparator producing an output state change when the back emf signal of said motor coil exceeds a value determined by said preset bias current;
circuitry for biasing said second current path with a hysteresis bias current connected to said second node of said second current path;

circuitry for switchably biasing said first current path with an increased hysteresis bias current connected to said second node of said first current path; and
a switch operative in response to the output state change of said comparator to switchably apply the increased hysteresis bias current to said first current path.

18. The circuit of claim 17 wherein said field coil is one of a plurality of motor field coils connected in a "Y" configuration, and said reference potential connected to said transistor of said second current path is produced at a center tap connection of said plurality of motor field coils.

19. The circuit of claim 17 wherein said means for switchably biasing said second current path with an increased preset bias current comprises means for switchably biasing said second current path with a bias current of twice said preset bias current.

20. The circuit of claim 17 wherein said two resistive elements of each of said first and second current paths are FETs.

21. The circuit of claim 17 wherein said means for switchably biasing said first current path with an increased hysteresis bias current comprises means for switchably biasing said first current path with a bias current of twice said hysteresis bias current.

22. The circuit of claim 17 further comprising means for switchably applying a bias current to both said first and second current paths, and means for generating a signal when said motor coil is floating for actuating said means for switchably applying a bias current.

23. The circuit of claim 17 wherein said comparator has an inverting input and a noninverting input operative to produce a change in output state when a voltage applied to the inverting input exceeds a voltage applied to the noninverting input, said first node of said first current path being connected to the inverting input of said comparator, and the first node of said second current path being connected to said noninverting input of said comparator.

24. The circuit of claim 17 wherein said two resistor elements of said first and second current paths are resistors.

25. A method for detecting a back emf signal of a motor coil for use in determining a position of the rotor of the motor, comprising:
generating a first voltage, proportional to a voltage on said motor coil with respect to a reference potential;
generating a second voltage, proportional to said reference potential, of the same proportional ratio as said first voltage is proportional to the voltage on said motor coil;
selectively generating a first signal during a detection period of the back emf signal developed in said motor coil, responsive to the back emf signal approaching a zero crossing from a predetermined direction;
adding a first fixed bias voltage to said second voltage to produce a first added voltage;
in response to said first signal, switchably adding a second fixed bias voltage higher than said first fixed bias voltage to said first voltage to produce a second added voltage; and
comparing said first and second added voltages to produce an output voltage corresponding to the back emf signal on the motor coil.

26. The method of claim 22 wherein said step of switchably adding a second fixed bias voltage higher than said first fixed bias voltage to said first voltage comprises switchably adding a bias voltage two times higher than said first fixed bias voltage.

27. The method of claim 25 further comprising:

adding a first hysteresis bias voltage to said first voltage; and in response to the output voltage, switchably adding a second hysteresis bias voltage higher than said first hysteresis bias voltage to said second voltage.

28. The method of claim 27 wherein said step of switchably adding a second hystereis bias voltage higher than said first hysteresis bias voltage comprises switchably adding a bias voltage two times higher than said first hysteresis bias voltage.

29. A method for operating a polyphase sensorless dc motor, comprising:

commutating field coil voltages in response to a back emf signal of a floating field coil crossing a reference voltage, the crossing being determined by:

generating a differential voltage proportional to voltage on said floating coil with respect to a reference potential;

selectively generating a first signal during detection of the back emf signal developed in said floating coils when the back emf signal approaches a zero crossing from a predetermined direction;

adding a first fixed bias voltage to said differential voltage to produce a first added voltage;

in response to said first signal, switchably adding a second fixed bias voltage larger than said first fixed bias voltage and of opposite polarity to said differential voltage to produce a second added voltage; and determining when the total resulting differential voltage crosses zero to produce an output voltage for timing said field coil commutation.

30. The method of claim 29 wherein said step of switchably adding a second fixed bias voltage larger than said first fixed bias voltage to said differential voltage comprises switchably adding a bias voltage two times larger than said first fixed bias voltage.

31. The method of claim 29 further comprising:

adding a first hysteresis bias voltage to said differential voltage proportional to a voltage on said motor coil, in response to the output voltage, switchably adding a second hysteresis bias voltage higher than said first hysteresis bias voltage and of opposite polarity to said differential voltage.

32. The method of claim 31 wherein said step of switchably adding a second hystereis bias voltage higher than said first hysteresis bias voltage comprises switchably adding a bias voltage two times higher than said first hysteresis bias voltage.

33. A method for operating a polyphase sensorless dc motor comprising:

amplifying a back emf signal of a selected floating field coil of said motor;

comparing said amplified back emf signal to a predetermined reference voltage;

determining when the slope of the back emf signal changes in said selected floating field coil; and modifying the predetermined reference voltage in response to said slope changes.

* * * * *